UNITED STATES PATENT OFFICE.

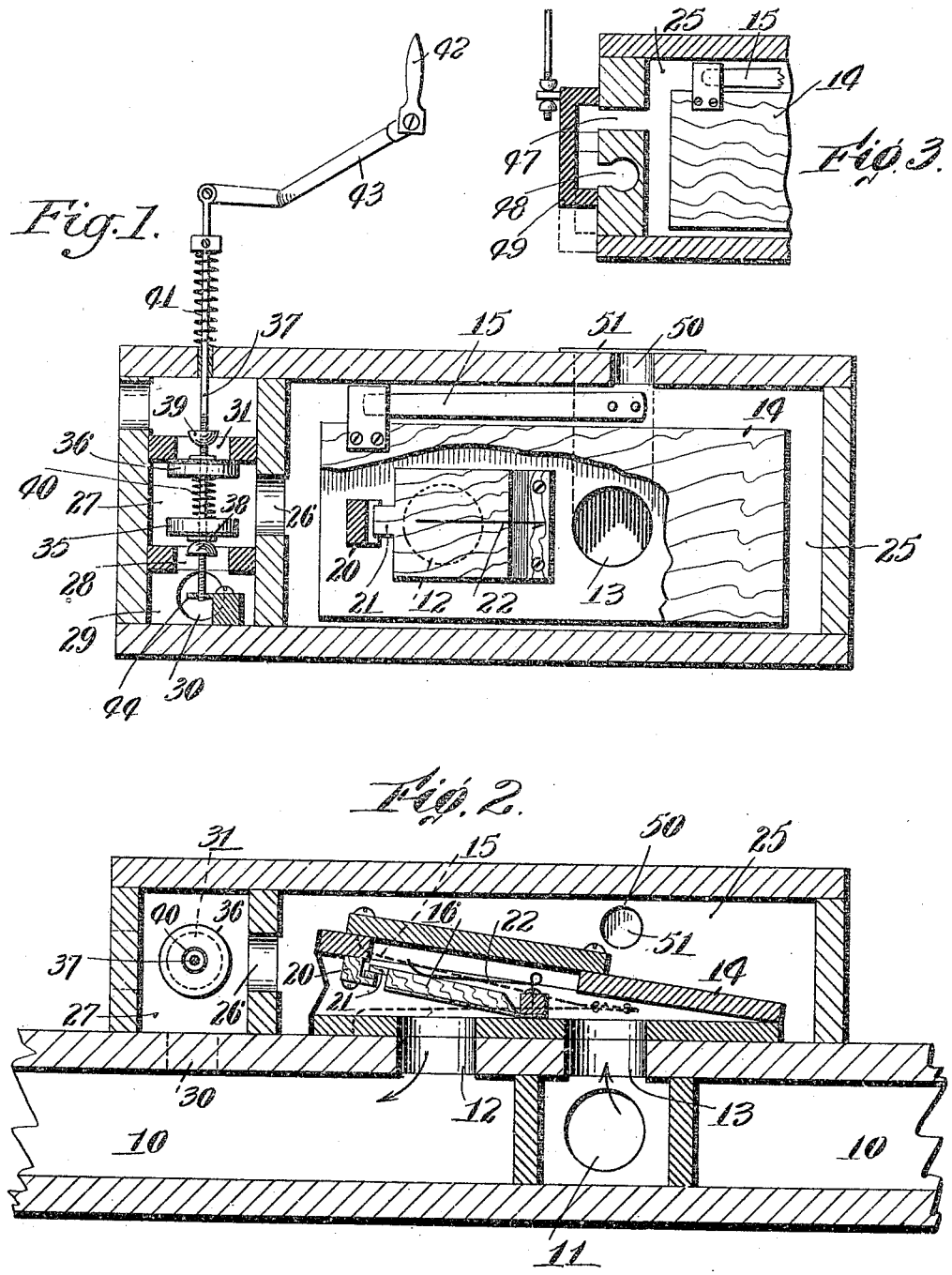

THOMAS DANQUARD, OF NEW YORK, N. Y., ASSIGNOR, BY MESNE ASSIGNMENTS, TO AUTO PNEUMATIC ACTION CO., OF NEW YORK, N. Y., A CORPORATION OF NEW YORK.

REGULATOR FOR PNEUMATIC MOTORS.

957,752. Specification of Letters Patent. Patented May 10, 1910.

Application filed November 4, 1907. Serial No. 400,682.

*To all whom it may concern:*

Be it known that I, THOMAS DANQUARD, a citizen of the United States, residing at New York, in the county of New York and State of New York, have invented a new and useful Regulator for Pneumatic Motors, of which the following is a specification.

This invention relates to a regulator capable of use for controlling pneumatic motors in general, but especially applicable to those for pneumatically operated musical instruments.

The principal objects of the invention are to provide a construction (preferably employing a form of regulator which consists of a collapsing pneumatic having a valve inside the same for controlling the flow of air through a wind-way) in which the controlling valve will be regulated entirely and exclusively by the pneumatic regulator itself without the employment of any mechanism extending through a wall of the regulator which would have to be packed and would induce leakage; also to provide an improved method of controlling the regulator preferably by pneumatic means so as to enable it to operate under certain conditions; to easily prevent its operation by pneumatic means controlled in any desired way, preferably by hand; and to provide a convenient and efficient form of valve for controlling and operating this pneumatic means.

Further objects and advantages of the invention will appear hereinafter.

Reference is to be had to the accompanying drawing which shows a preferred form of the invention as applied to a musical instrument, and in which—

Figure 1 is a longitudinal sectional view on the line 1—1 of Fig. 2. Fig. 2 is a central longitudinal sectional view of Fig. 1, and Fig. 3 is a sectional view showing another form of valve which may be used.

The drawing shows the invention applied to an instrument having a main wind-chest 10 provided with a wind-way 11 to the action which is not shown. The connection between the main wind-chest and said wind-way is through a wind-way comprising a pair of ports 12 and 13 which communicate respectively with the main wind-chest and the wind-way 11, and which communicate with each other through the interior of a governor or regulator 14 shown as comprising a well-known form of pneumatic normally held open or expanded by a spring 15. Inclosed within the pneumatic governor regulator 14 is a valve 16 for the port 12 normally closing said port with the flow of air from the action to the main wind-chest, as indicated by the arrows. The movable leaf of the regulator is provided with means which constitutes the only means for controlling the operation of the valve 16. This may be in any desired form, but is shown as comprising a projection 20 on the movable leaf engaging under a projection 21 on the valve 16. A light spring 22 preferably is employed to normally tend to hold the valve 16 to its seat. When the regulator is in the position indicated in Fig. 2, it is obvious that the air currents can have no effect on the valve 16, and consequently that the instrument will play under the direct air tension of the main wind-chest, and that the speaking effect will be under the direct control of the main bellows.

It has been proposed heretofore to provide a regulator pneumatic for operating a controlling valve contained therein with accompanying means extending into said pneumatic for holding said valve away from its seat to allow the playing of accented notes independently of the control of the pneumatic by the air currents. In order to do away with this construction of introducing an external element into the exhausted air chamber or passage requiring packing, and resulting, even in the best of constructions, in some leakage and wear, I have provided, according to the present invention, for controlling the operation of the regulator, external means independent of the passage of air through the wind-way between the main wind-chest and the wind-way 11, but still controlled pneumatically. This, in its preferred form consists simply in inclosing the regulator 14 in a chamber 25 which connects through a port 26 with a chamber 27, which in turn connects through a port 28 with a chamber 29. The chamber 29 is in constant communication with the main wind-chest 10 through an open port 30, and constitutes in effect a part thereof. The chamber 27 communicates with the outer air through a port 31.

Now in order to operate the device in the manner described, means is provided whereby the chamber 27 may be connected either with the outside air or with the wind-chest 10. When it is connected with the windchest there will be a degree of tension in the chamber 25 equal to that on the under side of the movable leaf of the regulator, and consequently, the spring 15 will hold the same in expanded condition as indicated in the drawings. Under this condition of affairs, the instrument will be played with accentuation of the notes. When it is desired to modulate the notes automatically, the connection is made in the other way, so that the chamber 25 is cut off from communication with the main wind-chest 10, and connected with the outside air through the port 31. Now there is atmospheric pressure on the outside of the movable leaf 14 which will overcome the spring 15 and collapse the regulator. Then the control of the regulator over the valve 16 is perfect, and it will cause that valve to operate automatically in accordance with the air tensions in the wind-way which it controls. If the air tension in the main wind-chest 10 decreases the governor pneumatic 14 will rise slightly and thus carry the valve 16 farther from its seat, and vice versa. In this way external means entering the governor is avoided, and the same is controlled by pneumatic means not requiring any such inadvisable construction, and operating with absolute efficiency on account of the fact that both sides of the movable leaf of the pneumatic will always be under the same tension or pressure when the parts are in the position shown in the drawings independent of the degree of tension or pressure in the main wind-chest.

The means for controlling the ports 28 and 31 may be of any ordinary or desired form. I have shown herein two preferred constructions, one of which embodies a pair of valves 35 and 36, both movably mounted on a valve stem 37 and having limiting buttons 38 and 39 adjustably mounted on screwthreads on said stem. A spring 40 normally forces said valves apart. This spring is long enough to keep both valves on their seats if their buttons did not force them away therefrom. A spring 41, slightly stronger than the spring 40, normally moves the valve stem so as to keep the valve 36 on its seat through the pressure of the spring 40 transmitted from the valve 35, which of course rests against its button 38 which is drawn back from its seat. The lever 42 is connected by an arm 43 with the valve stem to operate it. The valve stem preferably has a guide 44. Now when it is desired to have the valve 16 operate pneumatically to modulate the notes, the lever 42 is turned so as to force the valve stem down. The first effect of this is to lower the button 38, and this will allow the spring 40 to expand until the valve 35 is seated, but the valve stem 37 continues to move beyond this point until the button 39 engages the valve 36 and moves it away from its seat. Thus the chamber 25 is first cut off from the main wind trunk 10 and thereafter opened to the outside air so as to prevent any air entering the main wind-chest directly through the ports 31 and 28. When it is desired to change back to the original operation, the valve stem is lifted which first draws the button 39 away from the valve 36 and allows the latter to seat, and it is not until this is accomplished that the button 38 engages the valve 35 and lifts it. Thus on both motions, direct loss of air tension to the open air is avoided. One other form of valve which may be substituted for this is shown in Fig. 3. Here a chamber or port 47 takes the place of the chamber 27 in Fig. 1, and a chamber or port 48, communicates with the main wind-chest 10, as the port 28 does in Fig. 1. A valve 49 controls these chambers to connect them up in the two ways indicated in full and in dotted lines. In the former case the chamber is connected with the wind-chest and in the latter is open to the air.

It has been found that if the lever or handle 42 is moved very slowly, the valves 35 and 36 will come to a position where they will lock the air in the chamber 25, which, of course, prevents the regulator from working properly. This is overcome by providing means for permitting the air to escape from the casing or chamber 25 when it is caught therein as above indicated, which will operate at the same time to prevent the admission of air when there is any tension in the chamber 25. This in its preferred form consists of an opening 50 from the air chamber 25 to the outer air covered by a valve 51. This allows the regulator to open when the conditions demand it, but does not interfere with the playing, as described above.

In the course of the description of the mechanism shown in the drawings, the operation thereof has been described in full. It may be summarized as follows:—When the chamber 25 is connected with the main wind-trunk the valve 16 is held away from its seat so as to allow a free and unobstructed flow of air from the wind-way 11 into the main wind-chest. The parts may be held in this position for the accentuation of any particular note or chord, or for continued loud playing, as desired. In either case the instrument is put under the direct action of the suction bellows as long as the valve is held away from the seat by the regulator. If accentuation for only one note or chord is desired, the lever 42 is turned to the position shown in the drawings when the particular perforation or perforations come over the tracker. Now when it is desired to bring the parts in position to modulate or soften a note or notes automatically, the lever is turned the other way as stated, so as to allow the chamber 25 to communicate with the outer air, when, of course, the regulator is collapsed and the valve works in the automatic manner as stated.

Although I have described the invention as applied to a pneumatically controlled musical instrument, I am aware that it is capable of general application for the control of pneumatic motors.

While I have shown and described a preferred form of the invention, I am aware that many modifications may be made therein by persons skilled in the art without departing from the scope thereof as expressed in the claims. Therefore, I do not wish to be limited to the particular form or application of the invention shown and described, but What I do claim is:—

1. In a regulator for pneumatic motors, the combination with a wind-way, of a valve for controlling the flow of air therethrough, a pneumatic regulator for controlling the valve, said valve being located in said regulator, and means entirely outside said regulator connected with said wind way for controlling the pressure on the outside of said regulator.

2. In a regulator for pneumatic motors, the combination with a wind-way, of a valve for controlling the flow of air therethrough, and a pneumatic regulator for exclusively controlling the entire operation of said valve, said valve being located in said regulator and being movable from its seat independently of the regulator.

3. In a regulator for pneumatic motors, the combination with a wind-way, of a valve, a pneumatic regulator for controlling the valve having a movable leaf, and means whereby both sides of the movable leaf can be put into communication with the wind way to balance the tension or pressure on opposite sides thereof.

4. In a regulator for pneumatic motors, the combination with a wind-way, of a valve for controlling the flow of air therethrough, a pneumatic regulator for controlling the valve, said valve being located in said regulator, pneumatic means external to the regulator for controlling it, and valves for controlling the operation of said pneumatic means.

5. In a regulator for pneumatic motors, the combination with a wind-way, of a valve for controlling the flow therethrough, a pneumatic regulator for controlling the valve, means controlled independently of the flow of air through said wind-way for controlling the operation of said regulator, and pneumatic means for controlling the operation of said regulator by change of pressure or tension on the outside thereof.

6. In a regulator for pneumatic motors, the combination with a wind-way, of a valve for controlling the flow therethrough, a pneumatic regulator for controlling the valve, said valve being located in said regulator, means controlled independently of the flow of air through said wind-way for controlling the operation of said regulator, and pneumatic means for controlling the operation of said regulator by change of pressure or tension on the outside thereof.

7. The combination with a main wind-chest, of a wind-way, a port connecting the main wind-chest and wind-way, a valve for controlling said port, a pneumatic regulator, in which said valve is located, communicating with said wind-chest and port, and having means for moving the valve from its seat when the regulator is expanded, and a chamber in which said regulator is located, said chamber being connected with the main wind-chest.

8. The combination with a main wind-chest, of a wind-way, a port connecting the main wind-chest and wind-way, a valve for controlling said port, a pneumatic regulator communicating with said wind-way and port, and having means for moving the valve from its seat when the regulator is expanded, a chamber in which said regulator is located, and means for putting said chamber under tension.

9. The combination with a main wind-chest, of a wind-way, a port connecting the main wind-chest and wind-way, a valve for controlling said port, a pneumatic regulator communicating with said wind-way and port and having means for moving the valve from its seat when the regulator is expanded, a chamber in which said regulator is located, and means for connecting said chamber either with the main wind-chest or with the outside air.

10. The combination with a main wind-chest, a wind way, a port connecting the main wind-chest and wind-way, a valve for controlling said port, a pneumatic regulator communicating with said wind-way and port and having means for moving the valve from its seat when the regulator is expanded, a chamber in which said regulator is located, and means for connecting said chamber either with the main wind-chest or with the outside air, said means comprising a valve stem and a pair of valves both movably mounted thereon.

11. In a regulator for pneumatic motors, the combination of a regulator pneumatic, a valve therein controlled thereby, a chamber in which said pneumatic regulator is contained, a wind-chest, means for connecting said chamber with the wind-chest or with the external air, and means for permitting air pressure in the chamber to escape.

12. In a regulator for pneumatic motors, the combination of a chamber, a pneumatic regulator therein, means for connecting said regulator with a source of air tension or with the outer air, and means for permitting air pressure in the chamber to escape automatically.

13. In a regulator for pneumatic motors, the combination of a chamber, a pneumatic regulator therein, means for putting said chamber under tension, a port in the chamber, and a flap valve on the outside thereof for permitting the air pressure in the chamber to escape and for preventing the admission of air pressure from the outside.

14. In a regulator for pneumatic motors, the combination with a wind-way, of a valve for controlling the flow of air therethrough, a pneumatic regulator for exclusively controlling the entire operation of said valve, said valve being located in said regulator and being movable from its seat independently of the regulator, and external pneumatic means connected with said wind-way for controlling the operation of said regulator.

In testimony whereof I have hereunto set my hand, in the presence of two subscribing witnesses.

THOMAS DANQUARD. [L. S.]

Witnesses:
  W. L. KNEBEL,
  WM. P. COLLINS.